Sept. 27, 1932.  A. JAHN  1,879,279
MEAT CHOPPER
Filed Feb. 25, 1930
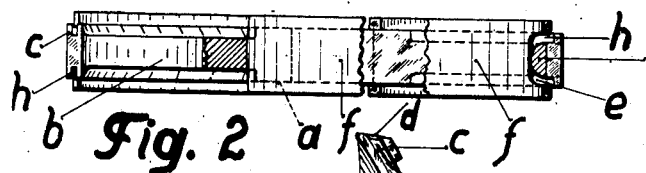
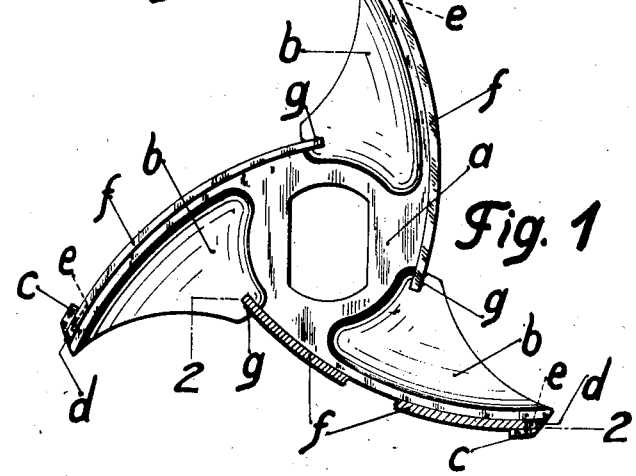
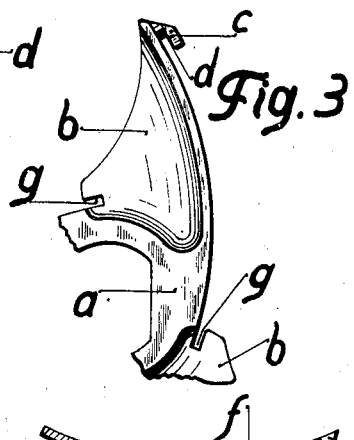
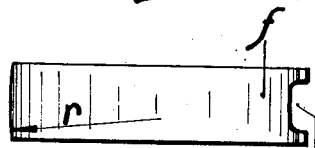
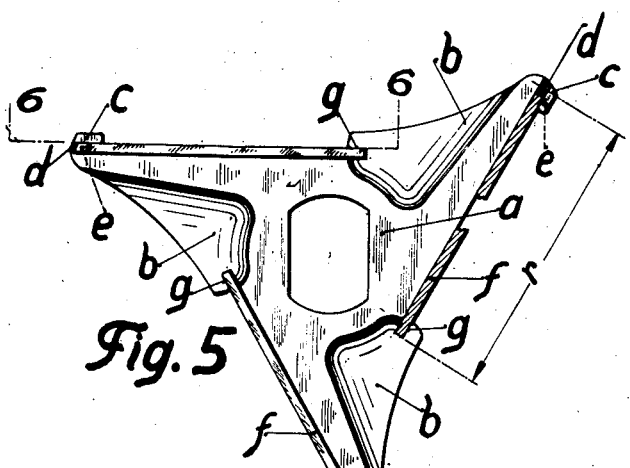
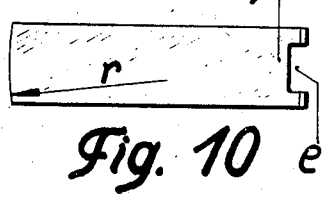
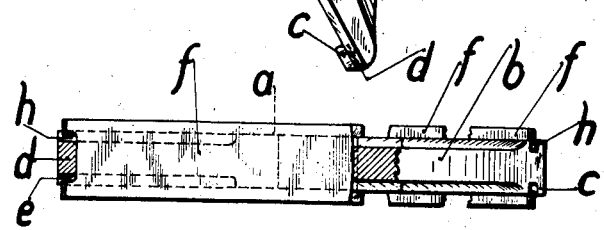
Witnesses:  Inventor:

Patented Sept. 27, 1932

1,879,279

UNITED STATES PATENT OFFICE

AUGUST JAHN, OF HAMBURG, GERMANY

MEAT CHOPPER

Application filed February 25, 1930, Serial No. 431,308, and in Germany September 25, 1929.

Meat chopping knives are known with interchangeable double-edged blades, one end of which engages fork-like with a pin of the knife body, their other likewise forked end being clamped onto the collar side of the knife body. These known knife blades are substantially of U-shaped cross section and clamped onto the knife body in such a manner that they cannot shift transversely to the cutting direction and consequently cannot adjust themselves to one another and to the perforated discs.

The disadvantage of such blades consists in the rigid fastening, which offers no guarantee that the blades bear uniformly along their entire length, and all blades at the same time, on the perforated discs. Thus, the quality of the material cut is unfavourably affected, and the blades together with the perforated discs are subjected to considerable and premature wear.

The invention relates to a meat chopper knife with exchangeable double edged blades engaging behind pins on the free ends of the knife arms and connected to the knife body without special fastening means, and overcomes this disadvantage in a very simple manner in that the known blades of rectangular or trapezium shaped cross-section engage with lateral play behind the retaining pins on the ends of the knife arms and on the collar and are slipped from the side into grooves in the knife arms.

This presents the advantage that the blades shift transversely to the cutting direction, that is can accurately adjust themselves to one another and to the perforated discs.

Several embodiments of the invention are illustrated by way of example in the accompanying drawing in which:—

Fig. 1 shows in side elevation a knife with curved blades.

Fig. 2 is a section on line 2—2 of Fig. 1.

Fig. 3 shows a part of the knife body, according to Fig. 1, but without knife blades.

Fig. 4 shows in longitudinal section a curved knife-blade.

Fig. 5 shows in side elevation a knife with straight blades.

Fig. 6 is a top plan view in section on line 6—6 of Fig. 5.

Fig. 7 shows a longitudinal section through a straight knife blade.

Fig. 8 is a cross section through a knife blade.

Figs. 9 and 10 show two forms of construction of a knife blade in top plan view.

The knife arms $b$ arranged around the collar $a$ have, according to the invention, each on its free end a pin $d$ with head $c$. Over each pin $d$ engages from the rear a cavity $e$ provided in the end of a knife blade $f$. The other end of the knife blade is rounded with a radius $r$ and engages in a slot $g$ in the knife body. The cavity $e$ engages with lateral play $h$, over the pin $d$ so that the knife blade can shift in lateral direction to its bearing surface by the amount of this play, whereby the knife blades, after being inserted between two perforated discs of a meat chopper can be accurately adjusted to one another. When the knife blade is mounted on the knife body the cavity $e$ of the knife blade $f$ is placed from the side over the pin $d$, the knife blade being then swung out around this pin so that its other end engages with the corresponding slot $g$ of the knife body. It may be further mentioned, that the pin $d$ may be of any desired cross section, i. e. round as shown in Fig. 2 or square as shown in Fig. 6.

I claim:—

1. The combination of a meat chopper knife body having arms thereon, a head at the end of each arm, a groove at the base of each arm and on the same side as the head, the channel thereof extending transversely of the arm, blades having a notched end to fit with lateral play under the head, the length of each blade being such that when the notched end is engaged under the head the other end can be swung sideways into the groove, the groove engaging that end of the blade.

2. A meat chopper knife assembly comprising a body to be mounted between cutter plates and rotated by the shaft of the meat chopper, arms on said body, a pin having an enlarged head at the end of each arm, a groove on the same side of each arm at its inner end, and blades each having a notch in one end wider than the pin, the other end of each blade being arcuate, the length of each blade being such that when the notch is engaged under the head of the pin the arcuate end can be slid into the groove at the inner end of the arm.

In testimony whereof I affix my signature.

AUGUST JAHN.